July 14, 1964 E. KUHN 3,140,823

ARRANGEMENT FOR ALIGNING ORDINAL ELEMENTS FOR A DIVISION

Filed Feb. 12, 1962 5 Sheets-Sheet 1

INVENTOR.
Eugen Kuhn
BY
Michael S. Striker
Attorney

July 14, 1964 E. KUHN 3,140,823

ARRANGEMENT FOR ALIGNING ORDINAL ELEMENTS FOR A DIVISION

Filed Feb. 12, 1962 5 Sheets-Sheet 2

INVENTOR.

Eugen Kuhn

BY Michael S. Striker

Attorney

July 14, 1964 E. KUHN 3,140,823

ARRANGEMENT FOR ALIGNING ORDINAL ELEMENTS FOR A DIVISION

Filed Feb. 12, 1962 5 Sheets-Sheet 3

INVENTOR.

Eugen Kuhn

BY Michael S. Striker

Attorney

July 14, 1964 E. KUHN 3,140,823

ARRANGEMENT FOR ALIGNING ORDINAL ELEMENTS FOR A DIVISION

Filed Feb. 12, 1962 5 Sheets-Sheet 4

INVENTOR.
Eugen Kuhn
BY
Michael S. Striker
Attorney

INVENTOR.
Eugen Kuhn
BY
Michael S. Striker
Attorney

United States Patent Office 3,140,823
Patented July 14, 1964

3,140,823

ARRANGEMENT FOR ALIGNING ORDINAL ELEMENTS FOR A DIVISION

Eugen Kuhn, Alt-Oberndorf, Germany, assignor to Olympia Werke AG, Wilhelmshaven, Germany Filed Feb. 12, 1962, Ser. No. 172,501
Claims priority, application Germany Feb. 11, 1961
10 Claims. (Cl. 235—60)

The present invention relates to an arrangement for aligning ordinal elements for a division, and more particularly to a mechanism provided in a calculator for aligning ordinal elements representing the highest orders of a divisor value and of a dividend value before a division operation is carried out.

In a known calculator, a stop is set when the dividend is entered from the pin carriage into the totalizer, and this stop is used for aligning the orders of the pin carriage containing the divisor with the orders of the totalizer containing the dividend. This arrangement has the disadvantage that a value, registered in the totalizer as a result of a preceding calculating operation, cannot be used as dividend so that the value has to be entered again in the pin carriage and transferred to the totalizer before the division operation can be started.

In another calculator, a sensing means with staggered stops is used for the alignment of the input device. The stops sense the positions of the ordinal elements registering the dividend starting from the highest order so that after the sensing of all orders one of the stops is ready for the alignment of the input device. This apparatus has the disadvantage that the operation delays the division, since the drive is designed for movement of the sensing means through all orders, although only a very short movement may be actually required.

It is one object of the present invention to overcome the disadvantages of known apparatus for aligning ordinal elements of the input device and totalizer of a calculator in the manner required for a division.

It is another object of the present invention to align in a calculator the ordinal elements of a pin carriage and of a totalizer which, respectively, represent the highest orders of a divisor value and of a dividend value.

Another object of the present invention is to obtain the alignment of the pin carriage with the totalizer by utilization of the fact that the totalizer registers zeros in all orders above the highest order of the dividend.

Another object of the present invention is to provide a simple, reliable, and rapidly operating apparataus for the purpose of aligning the ordinal elements of a pin carriage and of a totalizer before a division.

With these objects in view, one embodiment of the present invention is provided in a calculator comprising a totalizer device, an input device, such as a pin carriage, and an ordinal series of stop means movable between an inoperative position and a blocking position for stopping movement of the pin carriage. Each stop means is operatively connected to one ordinal element of the totalizer and operable to assume a blocking position in orders where the ordinal elements of the totalizer are in a zero position. Since all orders above the highest order of the dividend register zero, the pin carriage is stopped by the stop means of order above the highest order in which an ordinal element of the totalizer registers a value different from zero.

In a preferred embodiment of the present invention, the ordinal differential means, which are used in calculators of the type with which the present invention is concerned to connect the pin carriage with the totalizer, are used for controlling the stop means.

The stop means are biased, and where the respective differential means are not in the zero position, the stop means assume a position located in the path of movements of the respective differential means. However, where a differential means is in the zero position, since zero is registered in the respective order of the totalizer, the respective stop means is confined by the respective differential means in a preset position. This will be the case in all orders above the highest order of the dividend.

Stop means located in the path of movement of the differential means are shifted to an inoperative position when the differential means are operated to move to a home position. This will be the case in the orders where the dividend is registered.

When a key is operated, all stop means are raised, and those stop means which are in the preset position assume a blocking position located in the path of movement of the pin carriage so that the tabulated pin carriage is stopped by the stop means associated with the order above the highest dividend order. Since all stop means are simultaneously preset, and shifted to the blocking position, the operation is very fast.

Any number registered in the totalizer can be directly used as dividend, and the divisor can be directly entered into the pin carriage.

In the preferred embodiment of the invention, the stop means are mounted on a shaft for turning and translatory movement and all stop means are raised by shifting the shaft under control of an operating key. The stop means are longitudinally shifted to the inoperative position by the differential means. Consequently, each stop means moves only for a very short distance, which again results in a very fast operation.

The novel features which are considered as characteristic for the invention are set forth in particular in the appended claims. The invention itself, however, both as to its construction and its method of operation together with additional objects and advantages thereof, will be best understood from the following description of specific embodiments, when read in connection with the accompanying drawing, in which:

Figure 1:
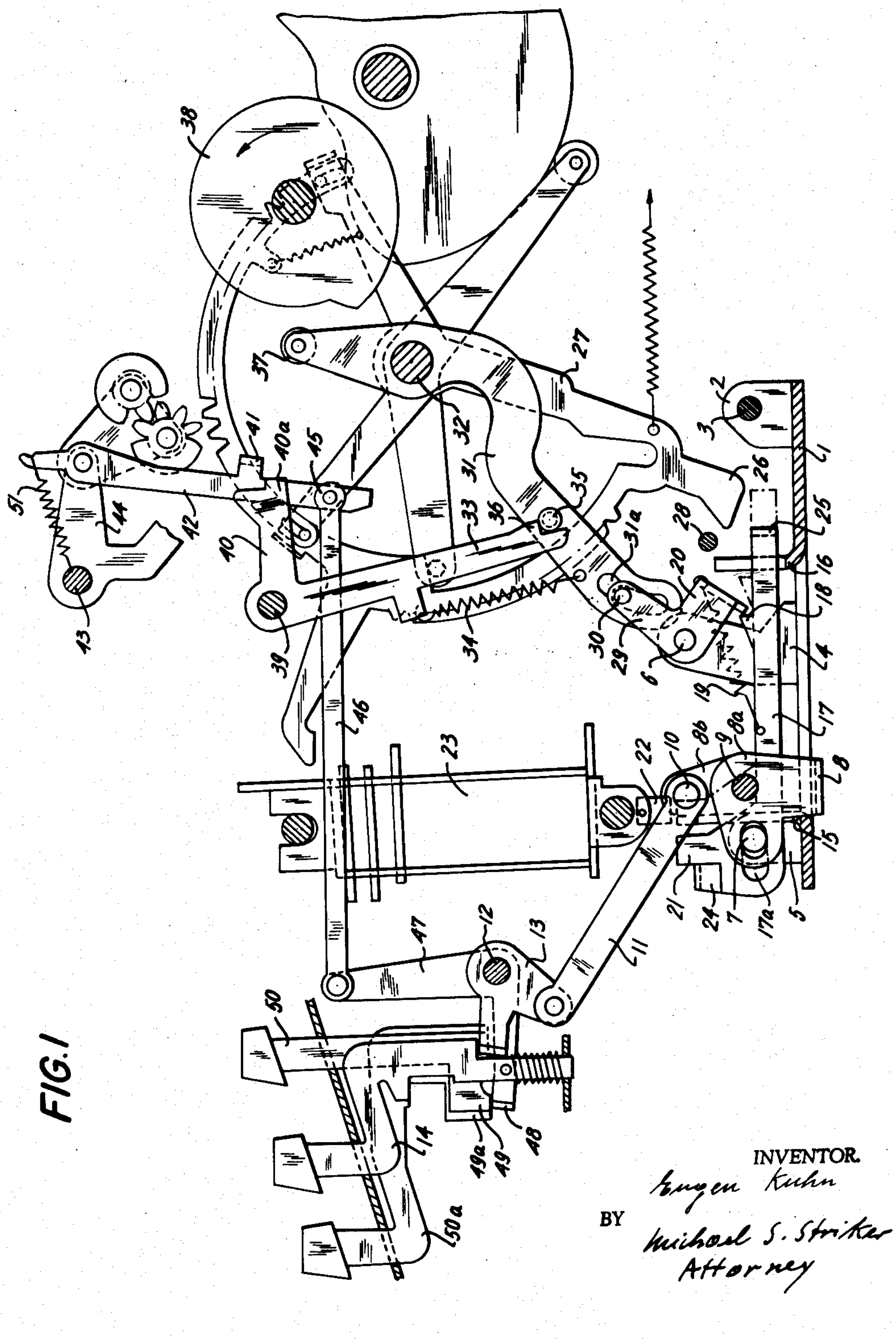
FIG. 1 is a side elevation, partly in section, illustrating a calculator provided with the apparatus of the present invention with conventional parts omitted for the sake of clarity.
Figure 2:
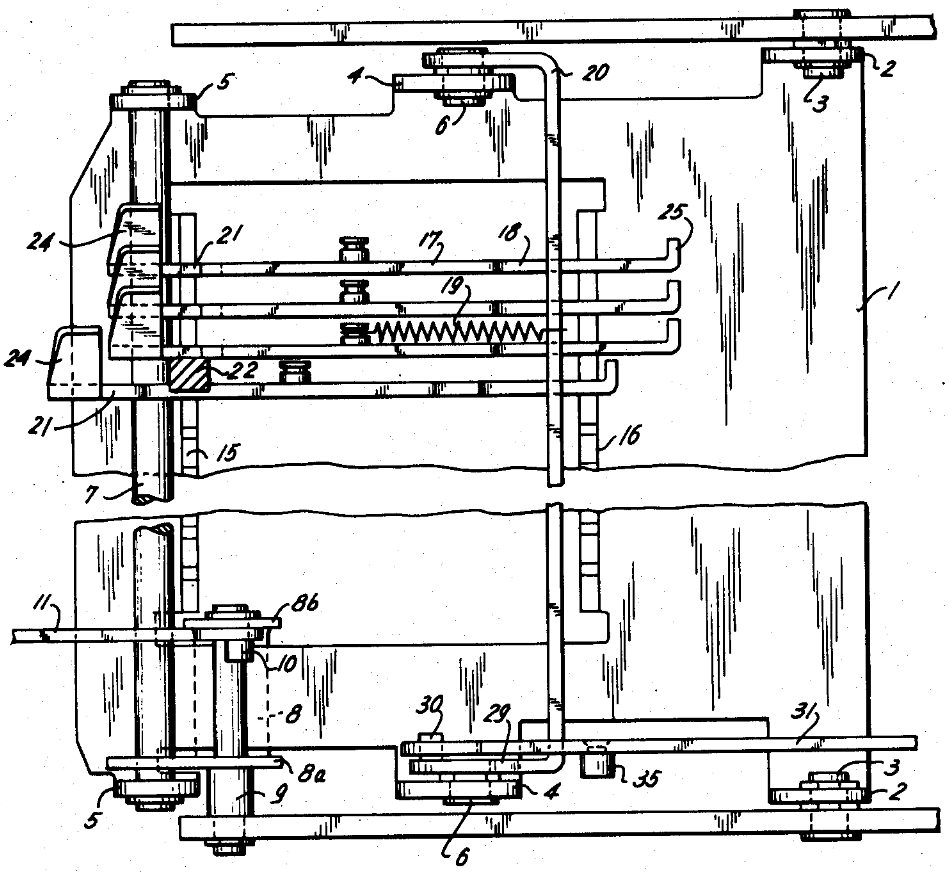
FIG. 2 is a fragmentary plan view taken on line 2—2 in FIG. 1 and omitting, for the sake of clarity, the elements shown in the upper portion of FIG. 1.

Referring now to the drawings, and more particularly to FIGS. 1 and 2, a pair of frame walls, best seen in FIG. 2, support stud shafts 3 on which brackets 2 of a support 1 are mounted for turning movement. Support 1 has in the center portion thereof, two other brackets 4 supporting stud shafts 6 on which the bridge-shaped means 20 is turnably mounted. One leg of bridge-shaped means 20 has an arm 29 with a guide pin 30 which is located in a curved slot 31*a* on the lever 31 mounted on a shaft 32. The free end of lever 31 has a cam follower roller 37 cooperating with a rotary cam 38. The shafts on which cam 38 is mounted, and shaft 32 are supported in the frame of the machine. Bridge-shaped means 20 can be turned by lever 31 between the position shown in FIGS. 1 and 4, and the position shown in FIG. 3.

The forward end of support 1 has two brackets 5 on which a shaft 7 is mounted. Shaft 7 passes through aligned openings in arms of a U-shaped member 8 which is mounted for turning movement on a shaft 9 carried by a frame wall. Support 1 has cutouts through which legs 8*a* and 8*b* of member 8 pass, while the yoke of member 8 is located below a plate portion of support 1.

A key 14, by which a division is started, engages a projection of an angular lever 13 which is connected by link 11 and a pivot means 10 to the leg 8*b* of member 8. When key 14 is depressed against the action of a spring abutting the frame and a pin on key 14, lever 13 is turned and effects turning movement of member 8 about shaft 9 so that shaft 7 is raised and support 1 performs an angular movement about shaft means 3.

Support 1 has slotted guides 15 and 16 in which an ordinal series of stop means 17 are guided. Each stop means has an elongated slot 17*a* receiving shaft 7. Consequently, each stop means 17 can move in longitudinal direction of slot 17*a* between the position shown in solid lines, and the position shown in chain lines in FIG. 1. However, each stop means 17 can also turn about shaft 7 between the position shown in solid lines, and the position shown in chain lines in FIG. 3.

Each stop means 17 is connected by spring 19 to the yoke of the bridge-shaped means 20, and is consequently biased to move to the right as viewed in FIG. 1. Such movement is prevented in the position of FIG. 1 and FIG. 4 by the yoke of bridge-shaped means 20 which is engaged under the action of springs 19 by stop projections 18 of those stop means 17 which are in the position illustrated in solid lines in FIG. 1.

Figure 3:
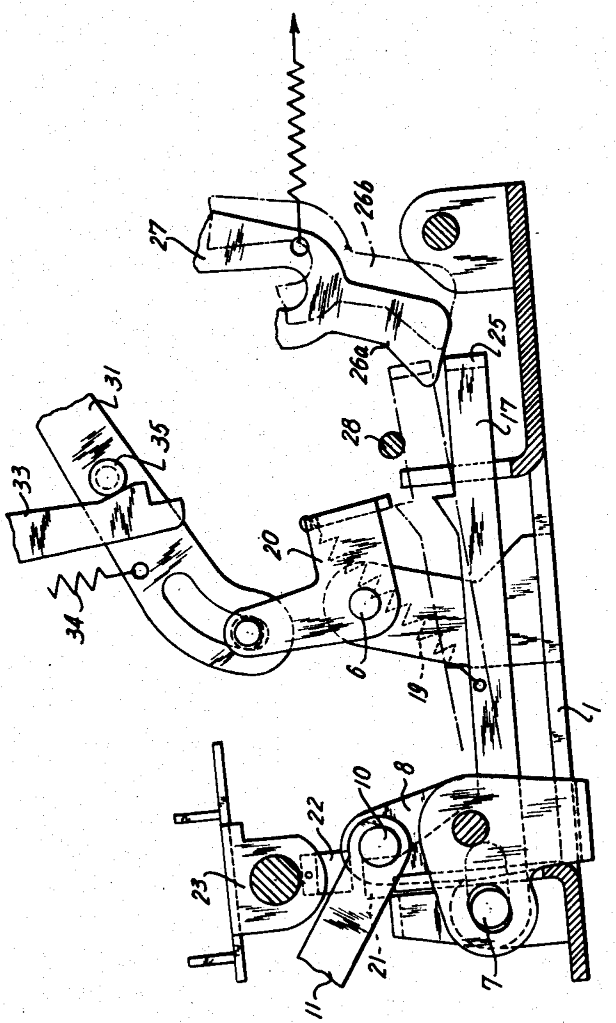
FIG. 3 is a fragmentary side elevation, partly in section, illustrating parts of the construction of FIG. 1 in another operational position.

Springs 19 extend at an angle to the stop means 17 so that stop means 17 are urged to move from the two positions shown in solid lines in FIG. 1 and FIG. 3 to the position shown in chain lines in FIG. 3 in which an abutment means 28 blocks further turning movement of the respective stop means 17. Movement of any stop means is only possible if the bridge-shaped means 20 which performs the function of a locking means is turned in counter-clockwise direction from the position of FIG. 1 to the position of FIG. 3.

Each stop means 17 has an abutment 21 which is located under a stop or abutment 2 of the pin carriage 23 when the stop means 17 is in one of the two positions shown in FIG. 3. If key 14 is operated to turn support 1 and to raise all stop means 17, only those stop means 17 which are in the position shown in FIG. 3 in solid lines will be raised to the blocking position shown in FIG. 4 in solid lines so that abutment 21 is located in the path of movement of the stop 22 of the pin carriage 23.

Each stop means 17 has a transverse oblique coupling projection 24 which projects into the path of movement of the stop means 17 of the next higher order, as best seen in FIG. 2 and is adapted to engage the abutment 21 of the stop means 17 of the next higher order. Transverse projections 25 are provided at the rear ends of stop means 17.

An ordinal series of differential sensing means 27 is provided in a conventional manner for actuating the ordinal elements of the totalizer of the calculator. The differential sensing means 27 have sensing arms for sensing the positions of the ordinal rows of pins of the pin carriage 23, as will be understood by those skilled in the art. Each differential means 27 has a toothed segment-shaped portion cooperating with ordinal gears, and a control portion 26 which is located opposite the projection 25 of the stop means 17 of the same order.

When a differential means 27 is in the zero position, corresponding to the respective ordinal element of the totalizer, the control portion 26 is in the position 26*a* shown in FIG. 3. When the respective ordinal element of the totalizer registers the digit one, the differential means 27 is in a displaced position in which control portion 26 is in the position 26*b* shown in chain lines in FIG. 3. The differential means 27 are movable beyond the zero position shown in FIG. 3 in solid lines to the home position shown in FIG. 1 in which control portion 26 is located farther to the left as viewed in the drawing.

As explained above, the bridge-shaped locking means 20 is connected by guide pin 30 to lever 31. A spring 34 is secured to lever 31 and to an angular lever 33 which is turnable about the fixed shaft 39. Spring 34 urges lever 31 to a position which the stop pin 35 of lever 31 abuts a shoulder on the end of lever 33 whereby turning movement of lever 31 under the action of spring 34 is prevented so that cam follower roller 37 cannot engage cam 38 as long as lever 33 is in the position illustrated in FIG. 1.

Arm 40 of lever 33 has an end portion 40*a* with a shoulder cooperating with a transverse pin 41 of a lever 42. A lever 44 is fixed on an actuating shaft 43 which is operated by the cyclically operating actuating means of the machine, and levers 44 and 42 are articulated to each other. The free end of lever 42 is connected by pivot means 45 to one end of a link 46 whose other end is articulated to an angular lever 47 mounted for turning movement on shaft 12. Lever 47 has a transverse projection 48 which is located opposite a projecting portion 49 of a dividend entry key 50, and also opposite the projection 49*a* of a sub-total key 50*a*. Since spring 51 urges link 46 through lever 42 to move to the right as viewed in FIG. 1, lever 47 is biased to return in clockwise direction, and projection 48 abuts projections 49 and 49*a* of keys 50 and 50*a*

Operation of key 50 or key 50*a* will result in shifting of lever 42 to a position in which projection 41 crosses the shoulder of portion 40*a* of lever 33, 40.

Figure 4:
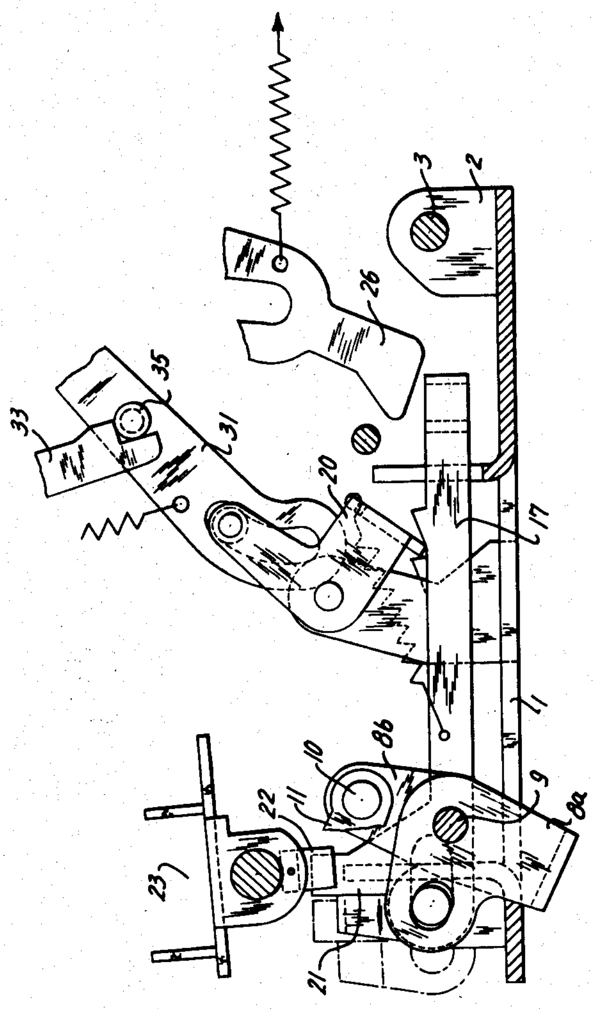
FIG. 4 is a fragmentary side elevation, partly in section, illustrating the mechanism of FIG. 3 in another operational position.
Figure 5:
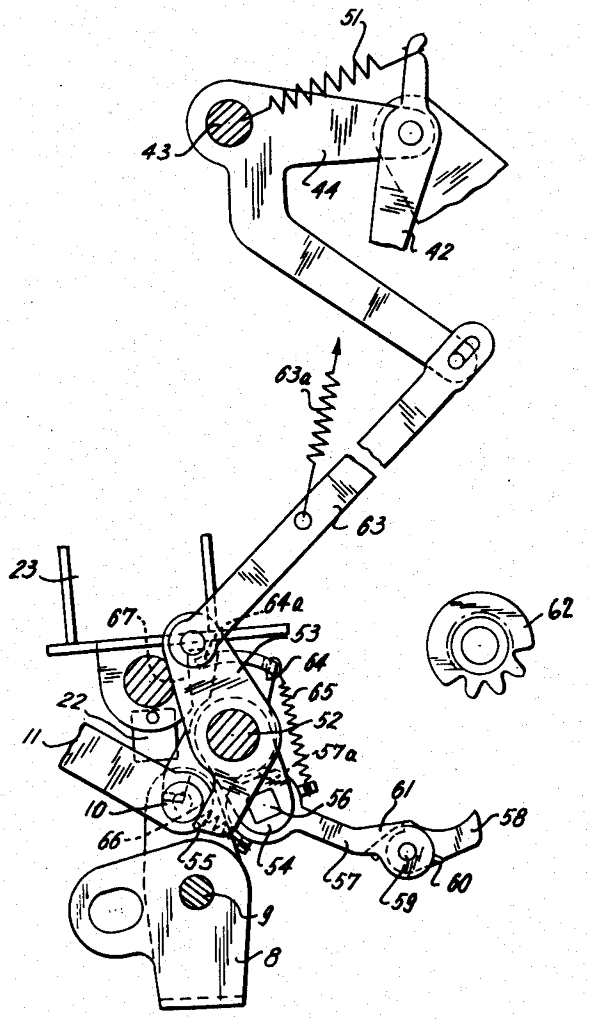
FIG. 5 is a fragmentary side elevation, partly in section illustrating other parts of the apparatus of the invention in connection with parts shown in FIGS. 1 to 4.

FIG. 5 illustrates further parts of the apparatus, which are omitted in FIGS. 1 to 4 for the sake of clarity. FIG. 5 shows the pin carriage 23, shaft 9 with member 8, and link 11 connecting member 8 with the division key 14, so that the position of shaft 52 relative to these elements, and to the other elements shown in FIG. 1 can be easily determined.

Two levers 53 and 54 are fixed to shaft 52, and lever 53 abuts with its arm 55 against pin 10 which projects from link 11, as best seen in FIGS. 1, 2 and 5. As explained above, pin 10 is shifted when key 14 is operated so that lever 53 is also displaced. A lever 63 is articulated to the other end of lever 53, and is biased by a spring 63*a*.

Lever 54 is rigidly connected with a square shaft 56 on which a lever arm 61 is mounted for longitudinal sliding movement. A pawl 58 is turnably mounted on a pin 59 of lever arm 57, and is spring-loaded and biased to assume the position shown in FIG. 5. Pawl 58 cooperates with the teeth of the gears 62 of a quotient register, the arrangement being such that each gear of the register 62 can be stepwise shifted by pawl 58 when engaged by the same.

A member 64 is mounted on shaft 52 for turning movement, and has two arms respectively connected by two springs 65 and 66 to the lever arm 57. Member 64 is movable along shaft 52 together with lever arm 57 and pawl 58. Lever 64 has a comb-like coupling part 64*a* having notches adapted to engage a projection 67 on pin carriage 23, and being spaced corresponding to the distances between ordinal elements of the pin carriage. Another portion of member 64 is located in a recess 57*a* in lever 57. In this manner, lever arm 57 can be coupled through lever 64 with the pin carriage 23 regardless of the position of the pin carriage since projection 67 can pass into different notches of the comb-like coupling part 64*a* of member 64. When the pin carriage 23 is coupled to lever arm 57, lever arm 57 moves with the pin carriage, and pawl 58 moves therewith along the ordinal elements of the quotient register 62.

The apparatus operates in the following manner:

A numerical value representing the dividend is registered in the totalizer. This numerical value may be the result of a preceding calculating operation, such as an addition. However, if it is desired to register a new numerical value in the totalizer as a dividend, the respective number is entered into the pin carriage 23 in a conventional manner, whereupon the dividend entry key 50 is depressed, and arrested in the depressed position until the machine cycle has been complete.

The projection 49 of key 50 turns lever 47 so that lever 42 turns in clockwise direction to a position in which projection 41 crosses the shoulder of end portion 40*a* of lever 33, 40. Depression of key 50 starts a cycle of the actuating means of the machine, so that the differential elements 27 are released during the first half of the machine cycle, and sense the pins of the pin carriage 23. During the second half of the machine cycle, the ordinal elements of the totalizer are engaged by the corresponding differential means 27 whereupon the differential means 27 return to their home position and transfer the numerical value sensed on the pin carriage 23 into the totalizer.

When the totalizer is engaged with the differential means 27, shaft 43 is turned in clockwise direction with lever 44 so that lever 33, 40 is turned in clockwise direction since arm 40 is coupled through parts 40*a* and 41 with lever 42. The abutment 36 is turned away from pin 35, so that lever 31 is no longer arrested and is turned by spring 34 in clockwise direction whereby lever arm 29 of locking means 20 is turned in counter-clockwise direction. Locking means 20 releases the projections 18 of all stop means 17.

If a number already registered in the totalizer as result of a preceding calculating operation, is to be used as dividend, the sub-total key 50*a* is depressed so that the linkage 46, 47 shifts lever 42. It will be understood by those skilled in the art that during a sub-total operation, the differential means 27 cooperate with the ordinal elements of the totalizer already during the first half of the machine cycle, and register the numerical values of the corresponding ordinal elements of the totalizer. Consequently, shaft 43 is actuated to turn during the first half of the machine cycle, and effects through linkage 44, 42, 33, and 31 release of the stop means 17 by locking means 20.

As best seen in FIG. 3, springs 19 urge all locking means 17 to the position shown in chain lines in FIG. 3. However, only the stop means 17 whose associated differential means 27 is in a position representing a digit different from zero, can reach this position, while the stop means 17 whose associated differential means 27 are in zero position, cannot turn to the upper position of FIG. 3. A control portion 26 of a differential means 27 in a position representing the digit 1 is shown at 26*b*. In this position, the control portion 26 is not located in the path along which projection 25 moves. In the zero position shown at 26*a*, the bottom edge of projection 26 extends over respective stop means 17 and prevents turning of the same from the lower positions shown in FIGS. 1 and 3 to the upper position shown in FIG. 3.

During the second half of the machine cycle, the differential means 27 are returned to the home position shown in FIG. 1, corresponding to a movement of control portions 26 to the left as viewed in FIG. 3. Control portions in the position 26a will move across the respective projection 25, and will not displace the respective stop means 17. Control portions in the position 26*b* will engage the respective projection 25 of the stop means which are in the upper position, and will shift the respective stop means to the left as viewed in the drawing while the upper edge of the stop means slides along the abutment rod 28.

If in the respective order of the totalizer a digit 1 to 9 was registered, the stop means 17 of the same order is shifted to the left while abutting the abutment 28. Consequently, its abutment 21 is not located opposite the abutment 22 of the pin carriage. Where an ordinal element of the totalizer registers zero, the respective stop means 17 remain in the lower position of FIG. 3, and are thus preset to control the movement of the pin carriage, since the abutments of these stop means 17 are located in the path of movement of abutment 22 of pin carriage 23. Since all ordinal elements of the totalizer above the highest order of the dividend are in zero position, the stop means 17 of the corresponding orders are in the preset position.

It must be prevented that a stop means 17 is preset where an ordinal element of the totalizer registers an order of the dividend representing the digit zero. The projection 21 of the stop means of the next higher order is shifted to the left to an inoperative position since such next higher order of the dividend registers a digit different from zero. During such shifting movement, projection 21 engages the transverse projection 24 of the stop means 17 of the next lower order, in which the dividend has a zero, and shifts the respective stop means 17 to the left as viewed in the drawing whereby any stop means of an order associated with a zero in the dividend is moved out of the preset position to the inoperative position.

At the end of the machine cycle, cam 38 of the cyclically operating actuating means of the machine engages cam follower roll 37 and turns lever 31 to its initial position shown in FIG. 1. At the same time, the totalizer is separated from the differential means 27, and shaft 43 is turned in counterclockwise direction so that lever 33 is shifted by spring 34 to the position arresting lever 31 through pin 35. The angular movement of lever 31 causes turning of locking means 20 to the position of FIG. 1 so that all stop levers 17 are turned down in clockwise direction to a position aligned in a horizontal plane. The stop means associated with the orders of the dividend are locked in the inoperative position by locking means 20, while the locking means 17 representing zero in the orders above the orders of the dividend are held in the preset position.

The divisor is now entered in the pin carriage, whereupon the division key 14 is operated. Key 14 turns member 8 through the linkage 11, 13 so that shaft 7 is raised and support 1 turns about shaft means 3. This position is illustrated in FIG. 4 which shows the preset stop means 17 raised to a blocking position in which the abutments 21 thereof are located in the path of movement of the abutment 22 of the pin carriage 23. Only the stop means 17 associated with the orders of the totalizer above the orders in which the dividend is stored, are in this blocking position. Consequently, the abutment 21 of the stop means 17 of the order directly above the highest order of the dividend will be of the first to be engaged by the abutment 22 of the pin carriage 23.

When member 8 is turned under control of key 14, the pin 10 on arm 8*b* is displaced, and acts on the arm 55 of lever 53 to turn the same in counterclockwise direction, as shown in FIG. 5. Shaft 52 and lever 54 turn with lever 53, and since lever arm 57 is connected to the square shaft 56 of lever 54, lever arm 57 turns in clockwise direction so that pawl 58 is placed in a position located opposite the gear 62 of the unit order of the quotient register.

Thereupon the pin carriage 23 is released so that it moves toward the higher orders until abutment 22 abuts the abutment 21 of the first stop means 17 which is in the blocking position shown in solid lines in FIG. 4. Abutment 22 is positioned relative to the ordinal elements of the pin carriage so as to stop the pin carriage, in a position in which the ordinal row of pins registering the highest order of the divisor cooperates with the differential means 27 which cooperates with the ordinal element of the totalizer in which the highest order of the dividend is registered.

During the movement of the pin carriage 23 to this position, lever arm 57 and pawl 58 move in axial direction since the comb-like member 64*a* couples lever 64, springs 65, 66, and lever arm 57 with the pin carriage. The division is then carried out in a conventional manner by repeated subtractions of the divisor from the dividend, and during each machine cycle, lever 63 is operated by the actuating means of the machine. Lever 53, lever 54, and lever arm 57 are turned in counterclockwise direction about shaft 52 so that pawl 58 shifts the gear 62 of the quotient register of the respective order one step for each subtraction. During the return stroke of levers 53, and 54 in clockwise direction, the spring-loaded pawl 58 yields and slips over the teeth of gear 62 without displacing the same.

After the operation has been completed in the highest order, pin carriage 23 is shifted one step to the next lower order so that pawl 58 cooperates with gear 62 of the next lower order of the quotient register.

When the division has been completed, the division key 14 is released, and returns to the inoperative position shown in FIG. 1, so that member 8 is turned back, and support 1 is lowered to the position shown in FIG. 1. Member 64, 57, 63 are turned by spring 63a to the inoperative positions shown in FIG. 5.

A divsion carried out by the apparatus of the present invention will be best understood with reference to a numerical example. The dividend "1075" is to be divided by the divisor "25."

The operator actuates the sub-total key 50a, since it is assumed that the dividend is already registered in the totalizer, for example as a result of a preceding addition.

During the following machine cycle, the stop means 17 of the first, second and fourth order are released by the locking means 20 and assume the position shown in chain lines in FIG. 3. All other stop means 17 are retained in the preset position shown in solid lines in FIG. 3 by control portions 26 in the position 26a, corresponding to zero registered in the totalizer and represented by the differential means 27 of the respective orders.

When the differential means 27 perform the return movement, the stop means 17 of the first, second and third order are shifted tot he left to the inoperative position, and the stop means 17 of the third order, where the dividend has a zero, is also shifted to the left to the inoperative position, since projection 21 of stop means 17 of the fourth order engages the transverse projection 24 of the stop means 17 of the third order so that the stop means 17 of the third order is coupled to the stop means 17 of the fourth order during its movement to the inoperative position. When the locking means 20 arrests all stop means in the position of FIG. 4, the four stop means 17 corresponding to the four orders of the dividend are locked in the inoperative position, while the stop means of all orders above the highest order of the dividend are locked in a preset position.

The divisor "25" is entered in a conventional manner into the pin carriage 23 which performs two steps. When the division key 14 is depressed, support 1 is raised with all stop means 17, the comb-shaped member 64a engages the flat projection 67 of pin carriage 23 and pawl 58 is placed opposite the gear 62 of the first order of the quotient register.

The first abutment 21 which is located in the path of movement of abutment 22 of the pin carriage 23 is the abutment 21 of stop means 17 of the fifth order. Consequently, the highest ordinal elements of the totalizer and of the pin carriage representing the digit 1 of the dividend and the digit 2 of the divisor are located opposite each other, while pawl 58 cooperates with the third ordinal element of the quotient register which, in the example used, will register a zero after the following machine cycle.

After the dividend has been entered in the pin carriage, one or several zeros may be entered in the pin carriage so that the dividend is registered in the totalizer in correspondingly higher orders. In this event, the pin carriage 23 registering the divisor will tabulate farther in a direction of the higher orders until the highest order of the pin carriage is aligned with the highest order of the totalizer registering the dividend. Consequently, pawl 58, which moves with the pin carriage, will start its operation in a correspondingly higher order of the quotient register, and it is possible to calculate one or several orders of the quotient after the decimal point. The number of calculated decimal fractions corresponds to the number of zeros after the dividend.

The apparatus has the additional advantage that a machine cycle is prevented when the divisor is a greater number than the dividend. In this event, abutment 22 of pin carriage 23 is located directly above the abutment 21 of a stop means 17 in the preset position shown in solid lines in FIG. 3 when key 14 is actuated, so that support 1 with stop means 17 cannot be raised since the top of abutment 21 engages the bottom face of abutment 22 of the pin carriage 23.

It will be understood that each of the elements described above or two or more together, may also find a useful application in other types of calculator differing from the types described above.

While the invention has been illustrated and described as embodied in an apparatus for aligning the ordinal elements of a pin carriage and of a totalizer corresponding to the highest orders of a divisor and of a dividend, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, are intended to be comprehended with the meaning and range of equivalence of the following claims.

What is claimed and desired to be secured by Letters Patent is:

1. In a calculator, in combination, an arrangement for aligning ordinal elements representing the highest orders of a divisor value and of a dividend value, comprising a totalizer having a series of movable ordinal elements for registering representations of a dividend value; a pin carriage having a series of ordinal elements for registering representations of a divisor value and an abutment, said pin carriage being operable to move between a plurality of ordinal positions in which different ordinal elements of said pin carriage and of said totalizer are located opposite each other; an ordinal series of stop means; a movable support supporting each stop means for movement independently of the other stop means between a first position, a second position and a third position, and supporting all stop means for simultaneous movement to a position in which stop means in said third position assume a blocking position located in the path of movement of said abutment of said pin carriage; means for urging said stop means to move to said second position; an ordinal series of differential means each operable to assume a position corresponding to the positions of one ordinal element of said totalizer, each differential means having a zero position and a plurality of other positions, differential means in said other positions causing said stop means to assume said inoperative position, and differential means in said zero positions causing said stop means to move to said blocking position; and key means for operating said support to move all stop means simultaneously so that stop means in said third position move to said blocking position and block movement of said pin carriage whereby said pin carriage by engagement with said abutment is stopped by the stop means of the lowest order in which an ordinal element of said totalizer registers zero, said abutment being positioned relative to said ordinal element of said pin carriage so that the highest ordinal element of said stopped pin carriage registering a divisor value is located opposite the highest ordinal element of said totalizer registering a dividend value.

2. A calculator arrangement as set forth in claim 1 wherein said support includes a shaft, and wherein said stop means are levers having slots receiving said shaft so that all levers move simultaneously when said support and said shaft are moved by said key means, and so that each lever turns on said shaft between said second and third positions.

3. A calculator arrangement as set forth in claim 2 wherein each differential element is located in the path of movement of the respective stop means only if the respective differential element is in zero position and guides the respective stop means into said third position, while differential elements not in said zero position permit turning movement of said stop means to said second position.

4. A calculator arrangement as set forth in claim 1 and including a locking means mounted on said support movable between a releasing position, and a locking position for locking said stop means in said first and third positions; and a manual key for effecting movement of said locking means from said locking position to said releasing position so that said stop means are free to move to said second position where the corresponding differential means represents a digit different from zero.

5. In a calculator, in combination, an arrangement for aligning ordinal elements representing the highest orders of a divisor and of a dividend, comprising cyclically operating actuating means; a totalizer having a series of movable ordinal elements for registering representations of a dividend value; a pin carriage having a series of ordinal elements for registering representations of a divisor value, said pin carriage being operable to move between a plurality of ordinal positions in which different ordinal elements of said pin carriage and of said totalizer are located opposite each other; a support located in the region of said pin carriage and being movable toward and away from the same to and from an operative position; an ordinal series of stop means mounted on said support for movement with the same, each stop means being mounted on said support for independent turning and shifting movement between a first inoperative position, a second turned position and a third shifted position; spring means urging each of said stop means to turn to said second position; locking means having a releasing position and a locking position for locking said stop means in said first and third positions; first manual key means for effecting movement of said locking means to said releasing position; an ordinal series of differential means, each operable by said actuating means to assume a position corresponding to the position of one ordinal element of said totalizer, each differential means having a plurality of digital positions including a zero position, and also a home position, each differential means cooperating with one or said stop means, and being located in said zero position in the path of movement of said stop means to said second position for causing in said zero position said stop means to assume said third position instead of said second position when said locking means moves to said releasing position, the stop means in said second position being located in the path of movement of said differential elements from the other digital positions to said home position so that upon movement of said differential elements by said actuating means said stop means in said second position are shifted to said first inoperative position in orders where said orders of said totalizer are not in zero position; and second manual key means operatively connected to said support for moving the same to said operative position so that stop means in said third position assume a blocking position located in the path of movement of said pin carriage for blocking the same whereby said pin carriage is stopped by the stop means of the lowest order in which an ordinal element of said totalizer registers zero and whereby the highest ordinal element of said pin carriage registering a divisor value is located opposite the highest ordinal element of said totalizer registering a dividend value.

6. In a calculator, in combination, for aligning ordinal elements representing the highest orders of a divisor and of a dividend, comprising cyclically operating actuating means; a totalizer having a series of movable ordinal elements for registering representations of a dividend value; a pin carriage having a series of ordinal elements for registering representations of a divisor value, said pin carriage being operable to move between a plurality of ordinal positions in which different ordinal elements of said pin carriage and of said totalizer are located opposite each other; a support located in the region of said pin carriage and being movable toward and away from the same to and from an operative position; an ordinal series of stop means mounted on said support for movement with the same, each stop means being mounted on said support for independent turning and shifting movement between a first inoperative position, a second turned position and a third shifted position, each stop means having a coupling projection extending into the path of movement of the stop means of the next higher order toward said first position so that each stop means moving to said first position shifts the stop means of the next lower order to said first position; spring means urging each of said stop means to turn to said second position; locking means having a releasing position and a locking position for locking said stop means in said first and third positions; first manual key means for effecting movement of said locking means to said releasing position; an ordinal series of differential means, each operable by said actuating means to assume a position corresponding to the position of one ordinal element of said totalizer, each differential means having a plurality of digital positions including a zero position, and also a home position, each differential means cooperating with one of said stop means, and being located in said zero position in the path of movement of said stop means to said second position for causing in said zero position said stop means to assume said third position instead of said second position when said locking means moves to said releasing position, the stop means in said second position being located in the path of movement of said differential elements from the other digital position to said home position so that upon movement of said differential elements by said actuating means said stop means in said second position are shifted to said first inoperative position in orders where said orders of said totalizer are not in zero position; and second manual key means operatively connected to said support for moving the same to said operative position so that stop means in said third position assume a blocking position located in the path of movement of said pin carriage for blocking the same whereby said pin carriage is stopped by the stop means of the lowest order in which an ordinal element of said totalizer registers zero and whereby the highest ordinal element of said pin carriage registering a divisor value is located opposite the highest ordinal element of said totalizer registering a dividend value.

7. In a calculator, in combination, an arrangement for aligning ordinal elements representing the highest orders of a divisor and of a dividend, comprising cyclically operating actuating means; a totalizer having a series of movable ordinal elements for registering representations of a dividend value; a pin carriage having a series of ordinal elements for registering representations of a divisor value, said pin carriage being operable to move between a plurality of ordinal positions in which different ordinal elements of said pin carriage and of said totalizer are located opposite each other; a support located in the region of said pin carriage and being movable toward and away from the same to and from an operative position; an ordinal series of stop means mounted on said support for movement with the same, each stop means being mounted on said support for independent turning and shifting movement between a first inoperative position, a second turned position and a third shifted position; spring means urging each of said stop means to turn to said second position; locking means having a releasing position and a locking position for locking said stop means in said first and third positions; first manual key means for effecting movement of said locking means to said releasing position; an ordinal series of differential means, each operable by said actuating means to assume a position corresponding to the position of one ordinal element of said totalizer, each differential means having a plurality of digital positions including a zero position, and also a home position, each differential means cooperating with one of said stop means, and being located in said zero position in the path of movement of said stop means to said second position for causing in said zero position said stop means to assume said third position instead of said second position when said locking means moves to said releasing position, the stop means in said second position being located in the path of movement of said differential elements from the other digital position to said home position so that upon movement of said differential elements by said actuating means said stop means in said second position are shifted to said first inoperative position in orders where said orders of said totalizer are not in zero position; second manual key means operatively connected to said support for moving the same to said operative position so that stop means in said third position assume a blocking position located in the path of movement of said pin carriage for blocking the same whereby said pin carriage is stopped by the stop means of the lowest order in which an ordinal element of said totalizer registers zero and whereby the highest ordinal element of said pin carriage registering a divisor value is located opposite the highest ordinal element of said totalizer registering a dividend value; a quotient register having ordinal elements; a shifting means operated by said actuating means for actuating said quotient register and being mounted for movement along the same between positions cooperating with different ordinal elements of said quotient register; and means for coupling said shifting means with said pin carriage.

8. In a calculator, in combination, an arrangement for aligning ordinal elements representing the highest orders of a divisor and of a dividend, comprising cyclically operating actuating means; a totalizer having a series of movable ordinal elements for registering representations of a dividend value; a pin carriage having a series of ordinal elements for registering representations of a divisor value, said pin carriage being operable to move between a plurality of ordinal positions in which different ordinal elements of said pin carriage and of said totalizer are located opposite each other; a support located in the region of said pin carriage and being movable toward and away from the same to and from an operative position; an ordinal series of stop means mounted on said support for movement with the same, each stop means being mounted on said support for independent turning and shifting movement between a first inoperative position, a second turned position and a third shifted position; spring means urging each of said stop means to turn to said second position; locking means having a releasing position and a locking position for locking said stop means in said first and third positions; first manual key means for effecting movement of said locking means to said releasing position; an ordinal series of differential means, each operable by said actuating means to assume a position corresponding to the position of one ordinal element of said totalizer, each differential means having a plurality of digital positions including a zero position, and also a home position, each differential means cooperating with one of said stop means, and being located in said zero position in the path of movement of said stop means to said second position for causing in said zero position said stop means to assume said third position instead of said second position when said locking means moves to said releasing position, the stop means in said second position being located in the path of movement of said differential elements from the other digital position to said home position so that upon movement of said differential elements by said actuating means said stop means in said second position are shifted to said first inoperative position in orders where said orders of said totalizer are not in zero position; second manual key means operatively connected to said support for moving the same to said operative position so that stop means in said third position assume a blocking position located in the path of movement of said pin carriage for blocking the same whereby said pin carriage is stopped by the stop means of the lowest order in which an ordinal element of said totalizer registers zero and whereby the highest ordinal element of said pin carriage registering a divisor value is located opposite the highest ordinal element of said totalizer registering a dividend value; a quotient register having ordinal elements; a shifting means operated by said actuating means for actuating said quotient register and being mounted for movement along the same between positions cooperating with different ordinal elements of said quotient register; and means for coupling said shifting means with said pin carriage, said coupling means being controlled and operated by said second manual key means so that said pin carriage is coupled to said shifting means when said stop means are placed in said blocking position before a tabulating movement of the pin carriage.

9. An arrangement as set forth in claim 8 wherein said coupling means include a coupling lever having a comb-shaped coupling part formed with notches spaced corresponding to the spacing of the ordinal elements of said pin carriage, said pin carriage having a coupling part adapted to pass into said notches; and shaft means supporting said coupling lever and said shifting means for movement in direction of the movement of said pin carriage.

10. An arrangement as set forth in claim 5 wherein said pin carriage has an abutment; and wherein said stop means have abutments located in the path of movement of said abutment of said pin carriage when the respective stop means is in said blocking position if more ordinal elements of said totalizer register numbers than ordinal elements of said pin carriage; and wherein if more ordinal elements of said pin carriage register numbers than ordinal elements of said totalizer, one of said abutments of said stop means is aligned in the direction of the movement of said support to said operative position with said abutment of said pin carriage so that movement of said support to said operative position under control of said second manual key means is blocked and a division operation is prevented.

References Cited in the file of this patent

UNITED STATES PATENTS

| | | |
|---|---|---|
| 2,821,342 | Capellaro | Jan. 28, 1958 |
| 2,905,382 | Carnacina | Sept. 22, 1959 |
| 3,024,975 | Sundstrand | Mar. 13, 1962 |